Sept. 4, 1928.
A. MIJARES
1,683,477
INLET MECHANISM FOR CARBURETORS
Filed Oct. 19, 1926
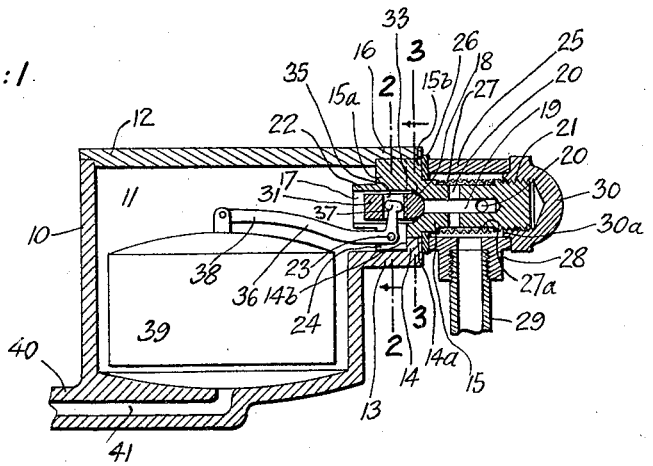
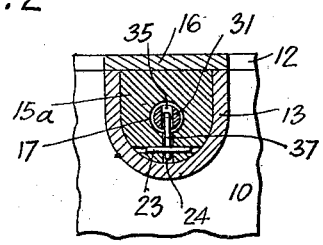
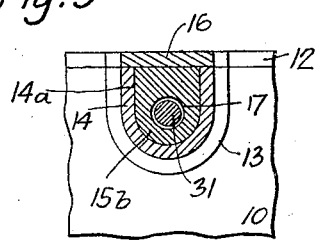
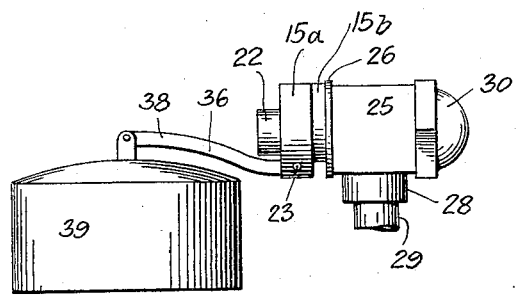
ANILO MIJARES
INVENTOR
BY Walter E. Wallheim
ATTORNEY Patented Sept. 4, 1928.

1,683,477

UNITED STATES PATENT OFFICE.

ANILO MIJARES, OF YONKERS, NEW YORK.

INLET MECHANISM FOR CARBURETORS.

Application filed October 19, 1926. Serial No. 142,654.

This application refers to fuel inlet mechanism for carburetors and is a continuation in part of an application, Serial #105,718 filed by me on April 30, 1926.

It is the particular object of the invention to provide the fuel bowl of a carburetor with inlet mechanism which also carries the float common to such apparatus, to enable the entire mechanism to be connected to and disconnected from the fuel bowl in a very simple manner, and to make it possible to assemble the parts comprising this mechanism prior to fastening it to the bowl.

Other objects will become apparent in the following specification and the acompanying drawings illustrative of a preferred embodiment of my invention, and in which Fig. 1 is a fragmentary longitudinal sectional view of the fuel bowl of a carburetor showing the inlet mechanism and the float operating means connected thereto;

Fig. 2 is a vertical cross sectional view along the plane of line 2—2 in Fig. 1;

Fig. 3 is a similar sectional view along the plane of line 3—3 in Fig. 1; and

Fig. 4 is an elevational view of the inlet mechanism unit itself, disconnected from the bowl.

Like characters of reference denote similar parts throughout the several views and the following specification.

10 is a fragmentary part of the casing of a carburetor having a fuel bowl or well 11 closed by a cover 12. At the top of one side of the well is a pocket-like extension 13, substantially U-shaped in cross section, open towards the well, its end wall 14 being recessed at 14$^a$, also U-shaped, but somewhat smaller than the inside of extension 13, so as to form a shoulder 14$^b$ therewith. 15 is a shank having a central portion 15$^a$ U-shaped to fit extension 13, and immediately adjacent thereto a somewhat smaller portion 15$^b$, shaped similarly to 15$^a$ to fit recess 14$^a$, whereby the shoulder formed between 15$^a$ and 15$^b$ contacts and corresponds in size with shoulder 14$^b$. The top of portions 15$^a$ and 15$^b$ are substantially flush and contact with the underside of an extension 16 of the cover 12 which forms a top closure for the extension 13. The interiorly projecting end of the shank 15 is bored out at 17, this bore being reduced by a valve seat 18 to a smaller bore 19 extending partially through the shank towards its outer end. 20 are ducts through shank 15 at substantially right angles to the bore 19 and near its inner end. The extreme end of shank 15 is threaded at 21. 22 is a small tubular extension at the inner end of the shank 15, its inner diameter forming part of bore 17. 23 is a fulcrum pin disposed transversely through the lower part of portion 15$^a$ of the shank and 24 is a longitudinal slot therethrough. Disposed over the outwardly projecting end of shank 15 is a strainer housing 25 which is preferably of hollow square shape. 26 is a washer adjacent recess 14$^a$ and positioned between the end wall 14 of the extension 13 and one end of the strainer housing 25. 27 is a strainer made of a flat fine mesh wire sheet, wound around and fitted within a recess 27$^a$ of the outer diameter of shank 15 so as to cover inlet ducts 20. One side of the strainer housing 25 is provided with a tubular extension 28 tapped interiorly for a gasolene supply pipe 29. 30 is a nut which has a circular extension 30$^a$ to fit a correspondingly shaped inner end of the housing 25. 31 is a fuel valve laterally disposed relatively to the well and loosely guided within bore 17 of shank 15, having a valve face 33 adapted to make a tight joint with seat 18. Valve 31 is provided with a transversely disposed slot 35. 36 is a substantially L-shaped lever, being fulcrumed at the junction of its two legs over the pin 23. The short leg 37 is fitted loosely between the walls of the slot 24 and extends within slot 35 of the valve 31. The other leg 38 of the lever 36 is bent slightly upwardly and has loosely suspended from its end a float 39. 40 is an extension at one side of the casing 10 having a duct 41 for the purpose of conducting the gasolene from the well 11 to the usual mixing chamber in the carburetor (not shown).

The operation of the inlet mechanism is well known in the art. Fuel is admitted through the strainer housing 25, ducts 20, bore 19, past valve 31 into the fuel well 11, and thence into discharge duct 41. As soon as the liquid fuel in the well reaches a predetermined height, the float in the well closes the valve 31 by assuming the position shown in Fig. 1. When the liquid level in the well drops, the float is lowered and gradually opens the valve.

In connecting the inlet mechanism to the carburetor, the entire inlet mechanism is first assembled as shown in Fig. 4 and then placed within the extension of the well of the carburetor so that portions 15ª and 15ᵇ fit, respectively, extension 13 and recess 14ª. The step between 13 and 14ª at the lower side of the shank is then drawn toward the shoulder 14ᵇ of the wall 14 by the tightening of the nut 30 which draws the housing 25 against the washer 26 and causes a fluid tight joint to be formed at the outside of the wall 14, and also effectively clamps the entire mechanism to the wall of the well. The extension of the cover 12 securely prevents lateral tilting of the shank 15 and also assists in holding the entire mechanism in place. If, for any reason, repairs on the inlet mechanism are needed, it is only necessary to loosen nut 30, and take off cover 12, when the entire unit can be removed.

It is obvious that various changes of form, proportion and minor details and combination of parts may be resorted to without departing or sacrificing any of the advantages of the invention, as defined in the appended claims.

What I claim as new, is:

1. In a carburetor having a fuel well, a removable fuel inlet unit comprising a shank adapted to be clamped to the said well, projecting outwardly and inwardly thereof, a fuel inlet connection at the outwardly projecting end of the shank, a float operably connected to its inwardly projecting end, and a valve slidably disposed within the said shank for regulating the admission of fuel into the well and operable by the said float.

2. In a carburetor, a fuel well having a recess in the top of its vertical wall, a removable inlet unit comprising a shank set within the said recess and projecting outwardly and inwardly of the said well, a shoulder on the said shank inwardly of and adjacent the said recess, a fuel inlet connection at the outwardly projecting end of the shank, a float in said well operably connected to its inwardly projecting end, a valve slidably disposed within the said shank for regulating the admission of fuel into the well and operable by the said float, and means at the outwardly projecting end of the said shank cooperating with its said shoulder to clamp the said inlet unit to the said well.

3. In a carburetor, a fuel well having a recess in the top of its side wall, a removable inlet unit comprising a shank set within the said recess and projecting outwardly and inwardly of the said well, a shoulder on the said shank inwardly of and adjacent the said recess, the said shank having fuel inlet ducts transversely through its outwardly projecting end, a housing over the said inlet ducts having a fuel connection, a float in said well operably connected to the said inwardly projecting end of the shank, a valve slidably disposed within a bore within the shank for regulating the admission of fuel from the said inlet ducts into the well and operable by the said float, and means at the outwardly projecting end of the said shank, cooperating with its said shoulder and the said housing, to clamp the said inlet unit to the said well.

4. In a carburetor, a fuel well having a recess in the top of its side wall, a removable inlet unit comprising a shank set within the said recess and projecting outwardly and inwardly of the said well, a shoulder on the said shank inwardly of and adjacent the said recess, the said shank having fuel inlet ducts transversely through its outwardly projecting end, a housing over the said inlet ducts having a fuel connection, a strainer over the said inlet ducts set within a recess on the outer surface of the shank within the said housing, a float in said well operably connected to the said inwardly projecting end of the shank, a valve slidably disposed within a bore within the shank for regulating the admission of fuel from the said inlet ducts into the well and operable by the said float, and means at the outwardly projecting end of the said shank, cooperating with its said shoulder and the said housing, to clamp the said inlet unit to the said well.

5. In a carburetor, a fuel well having a recess in the top of its side wall, a removable inlet unit comprising a shank set non-rotatably within the said recess and projecting outwardly and inwardly of the said well, a shoulder on the said shank inwardly of and adjacent the said recess, the said shank having fuel inlet ducts transversely through its outwardly projecting end, a housing over the said inlet ducts having a fuel connection, a strainer over the said inlet ducts set within a recess on the outer surface of the shank within the said housing, a float in said well operably connected to the said inwardly projecting end of the shank, a valve slidably disposed within a bore within the shank for regulating the admission of fuel from the said inlet ducts into the well and operable by the said float, a nut engaging the extreme outer end of the shank adapted to clamp its said shoulder against the inside of the well and the said housing against the outside of the well adjacent its said recess, and a cover for the well extending over the said recess.

In testimony whereof I have hereunto set my hand.

ANILO MIJARES.